Jan. 20, 1942.   F. RIEGLER   2,270,558
ADJUSTABLE SPECTACLE TEMPLES
Filed June 14, 1939
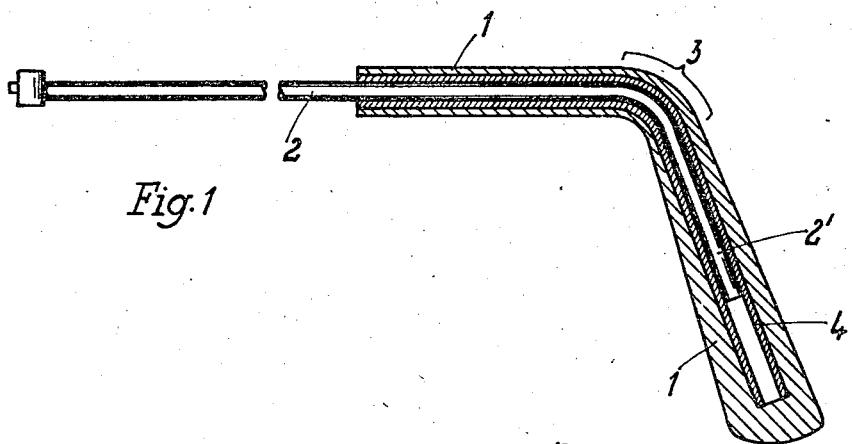
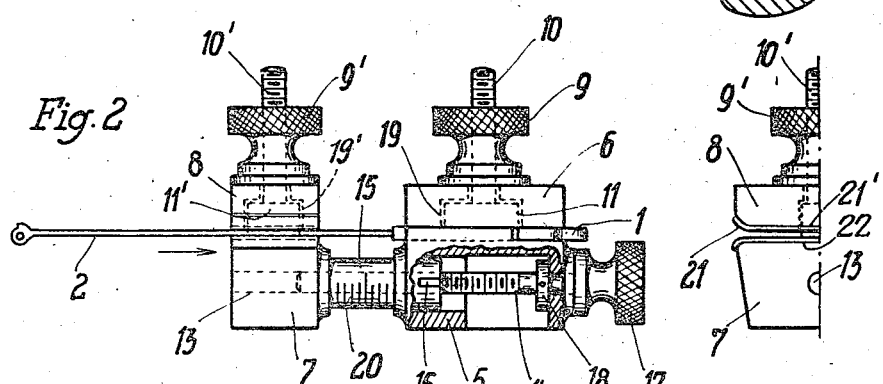
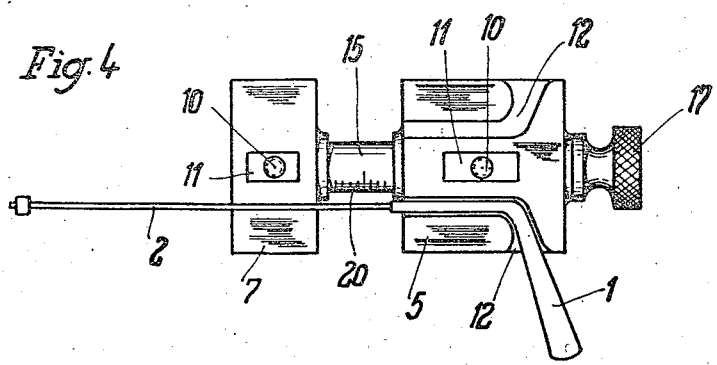
INVENTOR
FRIEDRICH RIEGLER.
BY Karl A. Mayr.
ATTORNEY Patented Jan. 20, 1942

2,270,558

UNITED STATES PATENT OFFICE 2,270,558

ADJUSTABLE SPECTACLE TEMPLES

Friedrich Riegler, Munich, Germany

Application June 14, 1939, Serial No. 279,162
In Germany August 29, 1938

4 Claims. (Cl. 88—52)

The present invention relates to adjustable temples for eyeglasses and a device for adjusting the length of the parts of the frame extending to the ears.

Hitherto threaded parts have been provided for adjusting the length of the temples of spectacles. Aside from the fact that such parts are expensive to make there is as a rule an unreliable connection and loosening up and undesired change of the length is unavoidable.

It is an object of the present invention to provide a spectacle frame which comprises temples which are longitudinally adjustable within the ear parts thereof and which fit into said ear parts so tightly that movement in said parts can only be effected by using great force and by means of a special apparatus. The tight fit is preferably provided in the bent or angular part of the temple. Without departing from the present invention the tight fit and length adjustment can be provided at any other point of the part of the frame extending to the ears. A great length of said frame part may be telescoped which is particularly desirable with frames made of Celluloid or other plastic material.

A further object of the present invention is the provision of a special apparatus by means of which the length adjustment can be accomplished accurately and without doing harm to the frame. This apparatus comprises holding members for the telescoping parts of the frame which members are movable with respect to one another similarly to the movable members of a vise and in the direction of the longitudinal adjustment, i. e., of the longitudinal axis of the frame members extending to the ears.

Further and other objects and advantages of the present invention will be apparent from the accompanying specification and claims and shown in the drawing which, by way of illustration, show what I now consider to be a preferred embodiment of my invention.

In the drawing:

Figure 1 is a part longitudinal sectional view of an adjustable spectacle temple according to the present invention.

Figure 2 is a part sectional side view of an adjusting apparatus according to the present invention.

Figure 3 is a part-front view of the device shown in Figure 2.

Figure 4 is a top view of the base part of the adjusting apparatus illustrated in Figure 2.

Like parts are designated by like numerals in all figures of the drawing.

Referring more particularly to Figure 1 of the drawing it will be seen that the connecting member 2 forms the core of the ear part or member 1 which is provided with a metal bush 4. Member 2 fits so closely into bush 4 that a longitudinal movement can be accomplished only by the application of great force. A certain part of the assembly, preferably the bend 3, is adapted to produce a clamping effect and causes the main resistance against relative movement of members 1 and 2. In order to prevent revolving of members 1 and 2 about one another member 2 and/or the inside of bush 4 may be provided with grooves 2'. Normally the core part 2 is made of metal and the ear part is made of plastic material such as tortoise shell, horn, Celluloid or other artificial material; without departing from the scope of the present invention both parts may be made of metal or plastic material.

Figures 2 to 4 illustrate an apparatus for producing longitudinal adjustment of spectacle frames according to the present invention. The main feature of this apparatus is the vise-like relative motion of holding members for individually holding frame parts 1 and 2. The configuration of the individual members is unimportant as long as they operate as stated and serve the before mentioned purpose.

The holding member which, for example, is adapted to hold the core part 2 comprises an upper clamping part 8 and a corresponding lower part 7, the latter being provided with an internally threaded extension or connecting part 15; screwed into said extension is a threaded spindle 14 the outer end of which is provided with a thumbwheel 17. The connecting member is longitudinally slidable within part 5 which is adapted to hold the ear part 1 of the spectacle frame; revolving of member 15 within part 5 is prevented by projections 16 which slide in corresponding recesses in part 5. Axial movement of spindle 14 is prevented by the provision of a collar 18 on said spindle. By manipulation of thumb wheel 17 the distance between the vise parts 7, 8 and 5, 6 can be changed; the extent of this change can be measured on the scale 20 provided on member 15. Always one of the clamping parts, in the case illustrated, the lower parts 5 and 7, is provided with an angular extension 11 and 11' respectively which loosely fit into corresponding recesses 19 and 19' provided in the upper clamp parts 6 and 8 respectively; threaded spindles 10 and 10' individually extend from parts 11 and 11' and through parts 6 and 8 respectively and carry thumb nuts 9 and 9' respectively. Manipulation of nuts 9 and 9' permits removal of the cover pieces 6 and 8 from or pressing of said pieces to the base parts 5 and 7.

As can be seen in Figure 4 the base part 5 is provided wtih recesses or grooves 12 into which the ear parts 1 of a spectacle frame can be inserted.

Two recesses 12 are provided in symmetric relation to provide for simultaneous adjustment of the two ear frame members of an eyeglass. It is no departure from the present invention if the recesses 12 are provided in the cover part 6 instead of in the base part 5.

The edges 21 of the cover parts 6 and 8 are well rounded so that the spectacle frames can be conveniently inserted without complete removal of the cover parts. Suitable exchangeable covering 21' and 22 may be provided on the clamping surfaces of the clamp members to protect the clamped in parts of the spectacle frame and also to increase adhesion.

Operation of the spectacle frame adjusting device:

Loosening of nuts 9 and 9'; insertion of frame members 1 and 2 until ear part 1 is in groove 12; tightening up of nuts 9 and 9' and securing temple in adjusting vise. Elongation or shortening of the temples is accomplished by manipulation of thumb wheel 17 whereby the position of the core member 2 is changed with respect to that of the ear part 1. Adjustment is measured on scale 20 and as soon as the desired change of length of the spectacle frame side members is obtained nuts 9 and 9' are loosened and the frames are removed.

While I believe the above described embodiment of my invention to be a preferred embodiment, I wish it to be understood that I do not desire to be limited to the exact details of design and construction shown and described, for obvious modifications will occur to a person skilled in the art.

I claim:

1. A spectacle frame having adjustable temples comprising a hollow unflexible ear member having a bent portion, and a flexible member extending into said ear member beyond said bent portion and tightly fitting yet being permanently slideable in said ear member.

2. A spectacle frame having adjustable temples comprising a substantially unflexible ear member having a bent portion, a cavity in said ear member extending beyond and being curved to substantially conform with said bent portion, and a flexible member permanently slidably and snugly fitting into said cavity and extending beyond said bent portion.

3. A spectacle frame having adjustable temples comprising an ear member having a bent portion, a cavity in said ear member extending beyond and being curved to substantially conform with said bent portion, a bush member lining said cavity, and a flexible member slideably and snugly fitting into said bush member and extending beyond said bent portion.

4. A spectacle frame having adjustable temples comprising a substantially unflexible hollow ear member having a bent portion, and a flexible member extending into said ear member beyond said bent portion and tightly fitting yet being permanently longitudinally slideable in said ear member, one of said members having longitudinal shallow grooves preventing rotation of said members about one another yet permanently permitting relative longitudinal movement thereof.

FRIEDRICH RIEGLER.